US008533340B2

(12) United States Patent
Ratcliffe et al.

(10) Patent No.: US 8,533,340 B2
(45) Date of Patent: Sep. 10, 2013

(54) IP MULTIMEDIA SUBSYSTEM VIRTUAL CALL/SESSION CONTROL FUNCTIONS

(75) Inventors: Mark Ratcliffe, Oakhurst, NJ (US); Gerald L. Hoover, Middletown Township, NJ (US); Min Lu, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1259 days.

(21) Appl. No.: 11/786,568

(22) Filed: Apr. 11, 2007

(65) Prior Publication Data

US 2008/0254795 A1 Oct. 16, 2008

(51) Int. Cl.
*G06F 15/16* (2006.01)

(52) U.S. Cl.
USPC .......................................... 709/227; 709/223

(58) Field of Classification Search
USPC ................................................ 709/223, 227
See application file for complete search history.

(56) References Cited

U.S. PATENT DOCUMENTS

| | | | |
|---|---|---|---|
| 6,931,453 B2 | 8/2005 | Aarnos et al. | |
| 6,934,756 B2 | 8/2005 | Maes | |
| 7,027,577 B2 | 4/2006 | Gourraud et al. | |
| 7,260,384 B2 * | 8/2007 | Bales et al. | 455/413 |
| 7,340,507 B2 * | 3/2008 | Tuunanen et al. | 709/219 |
| 7,383,327 B1 * | 6/2008 | Tormasov et al. | 709/220 |
| 7,522,921 B2 * | 4/2009 | Thompson | 455/433 |
| 7,570,635 B2 * | 8/2009 | Gotoh et al. | 370/389 |
| 8,041,795 B2 * | 10/2011 | Dahlin et al. | 709/222 |
| 2004/0187021 A1 | 9/2004 | Rasanen | |
| 2004/0242227 A1 | 12/2004 | Huotari et al. | |
| 2006/0114913 A1 | 6/2006 | Cai et al. | |
| 2006/0136557 A1 | 6/2006 | Schaedler et al. | |

FOREIGN PATENT DOCUMENTS

| | | |
|---|---|---|
| EP | 1089515 A2 | 4/2001 |
| WO | WO-0243405 | 5/2002 |
| WO | WO-2008127960 A1 | 10/2008 |

OTHER PUBLICATIONS

Distributed Redundant or Cluster Solution? and Experimental Evaluation of Two approaches for Dependable mobile Internet Services, Thibault Renier, 2005, Siemens AG.*
"International Application Serial No. PCT/US2008/059837, International Search Report and Written Opinion mailed Sep. 30, 2008", 13 pgs.
Bozinovski, M., "Fault-Tolerant Platforms for IP-based Session Control Systems", Internet Article, (Jun. 2004), 29-47 pgs.
Singh, et al., "Failover, load sharing and server architecture in SIP telephony", *Computer Communications, Elsevier Science Publishers*, BV, Amsterdam, NL, vol. 30, No. 5, (Feb. 20, 2007), 927-933 pgs.
Thibault, R., et al., "Distributed Redundancy or Cluster Solution? An Experimental Evaluation of two approaches for Dependable Mobile Internet Services", *Internet Article*, (Jan. 11, 2005), 35-41 pgs.
Thibault, R., et al., "Inconsistency Evaluation in a Replicated IP-based Call Control System", *Service Availability Lecture Notes in a Computer System*, LNCS, Springer, Berlin, DE, vol. 4328, (Jan. 1, 2006), 177-192 pgs.

* cited by examiner

*Primary Examiner* — David Lazaro
*Assistant Examiner* — Marie Georges Henry (57) ABSTRACT

Systems and methods provide virtual CSCFs in an IMS system. The Virtual CSCFs may be virtual S-CSCFs or virtual P-CSCFs. A master virtual CSCF may be used to distribute subscriber data and initial filter criteria to the virtual CSCFs in a group. Thus one of multiple servers may be used for processing call sessions for the same subscriber, thereby avoiding overloading a particular CSCF in an IMS system.

13 Claims, 7 Drawing Sheets

IP MULTIMEDIA SUBSYSTEM VIRTUAL CALL/SESSION CONTROL FUNCTIONS

FIELD

This application relates to IP multimedia systems, and more specifically to systems and methods for providing virtual call/session control in IP multimedia systems.

BACKGROUND

A typical IP Multimedia Subsystem (IMS) requires each subscriber to register to an instance of a Serving-Call/Session Control Functions (S-CSCF). In typical implementations, the S-CSCF is statically configured and tied to a piece of hardware, e.g., a server, that stores the registration for the particular subscriber. Once the subscriber is registered to an S-CSCF, all traffic to/from that subscriber, e.g., SIP phone, 3G wireless handset, IP PBX, teleconferencing, or a carrier using the wholesale access of a wholesale carrier, is delivered through that instantiation of the S-CSCF. The result is that even if IMS S-CSCF functions can be supported on multiple servers, the capacity to handle traffic and the reliability of calls completing to/from a particular subscriber is tied to the capacity and reliability of the individual server with which the subscriber is registered. This can be problematic as it requires a high performance/highly reliable server to provide the high quality of service required by Business VOIP (BVOIP) enterprise customers, and to provide the service levels Consumer VOIP (CVOIP) customers are accustomed.

For example, in an enterprise domain, some services have high concentrations of calls to or from a given telephone number. As an example of concentration of calls being place to a particular number, some reality shows have user voting that results in peaks of traffic being generated to the same relatively small set of phone numbers over a short time period. Similarly, there may be a concentration of calls being placed from a given telephone number. For example, a telemarketing company may place a large number of calls that originate from a given telephone number or lines on a PBX capable of VoIP calls. In either example, the traffic can overwhelm the capacity of the few servers handling these phone numbers, even while additional server capacity may exist in the network.

Other events may cause calls to be concentrated on a particular number. For example, a natural disaster may cause calls to be concentrated to a relatively few telephone numbers. Further, a large teleconference may cause calls to be concentrated on a single number.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

Figure 1:
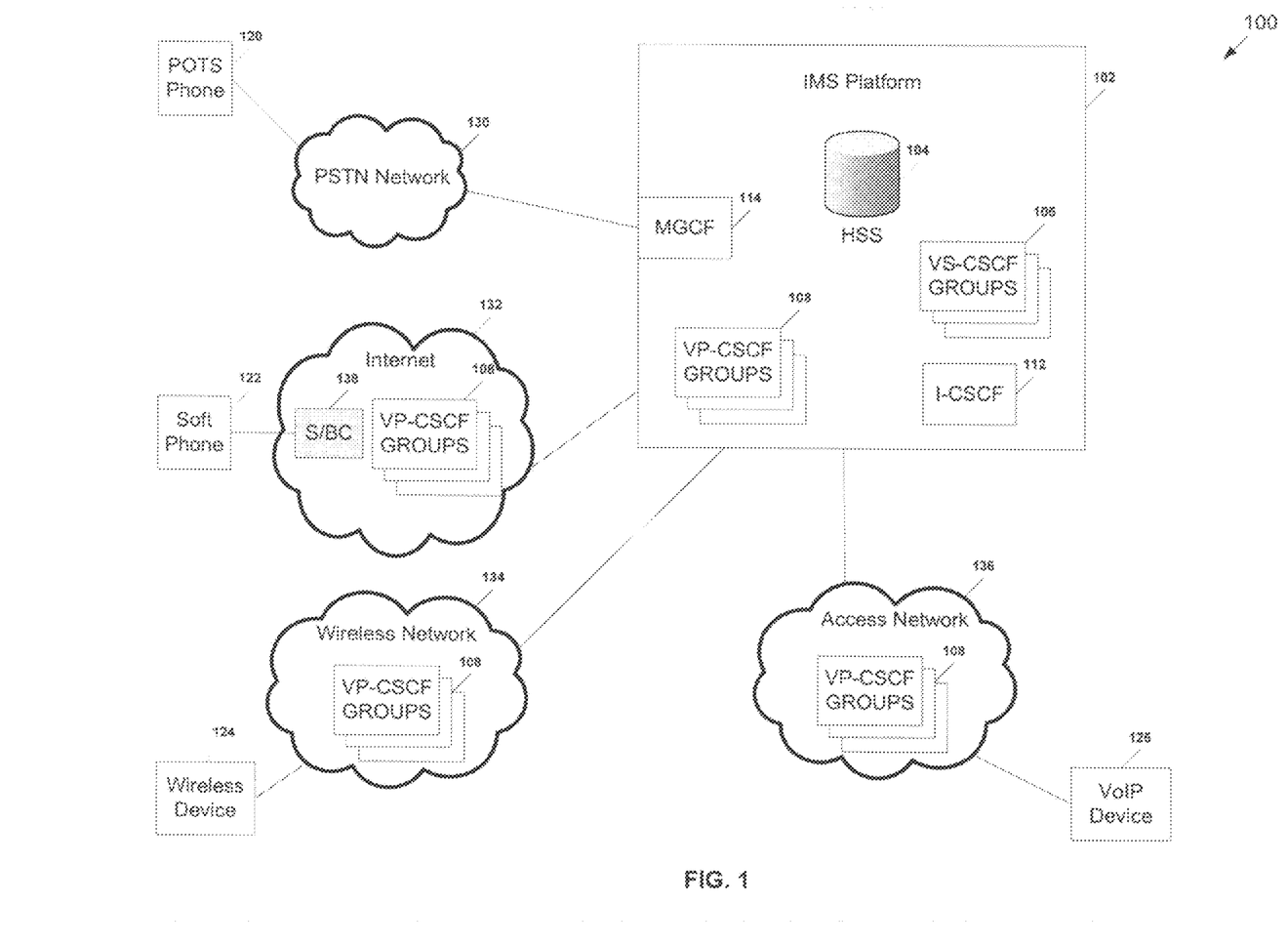
FIG. 1 is a block diagram of an IP Multimedia System having virtual call/session control functions in accordance with an example embodiment.

Referring to FIG. 1, an example embodiment of an IP Multimedia system (IMS) 100 for providing virtual call/session control functions (CSCF) is illustrated. The system 100 may include an IMS platform 102 having at least a home subscriber server (HSS) 104, one or more virtual serving call/session control function (VS-CSCF) groups 106, one or more virtual proxy call/session control function (VP-CSCF) groups 108, an interrogating call/session control function (I-CSCF) 112, and a media gateway control function (MGCF) 114.

IMS platform 102 may be communicably coupled to a variety of telecommunications devices through various communications networks. For example, IMS may communicate with a VoIP (Voice over Internet Protocol) device 126. VoIP device 126 may be any type of device that is configured to provide VoIP communications, including handsets, personal computers, laptop computers, personal digital assistants and similar devices.

IMS platform 102 may also communicate with a POTS (Plain Old Telephone Service) device 120 through a PSTN (Public Switch Telephone Network) 130. In this configuration, MGCF 130 provides for the conversion of voice signals on the PSTN network 130 to packet data suitable for transmission within an IMS architecture.

IMS platform 102 may further communicate with a soft phone 122 through Internet 132. Soft phone 122 may be any device that is configured to provide voice communication over Internet 122, and may include handsets, personal computers, laptop computers, personal digital assistants and the like. In this configuration, a session/border controller (SBC) 138 manages VoIP calls at the borders of an IP network such as Internet 132. In general, session border controller 138 provides a level of trust between the soft phone 122 and other components of the IMS platform 102 by protecting the components by identifying malicious traffic before it reaches the IMS platform 102. SBC 138 may also perform topology hiding and remove internal network information from the signalling stream thus preventing internal details from being propagated.

IMS platform 102 may also communicate with a wireless device 124 through a wireless network 134. Wireless device 124 may be any type of wireless device, including cellular or mobile telephone communications devices.

HSS server 104 provides a database of subscriber and service data. The data may include user identifications, roaming profiles, authentication parameters and service information for a variety of services or features that may be provided to subscribers though IMS platform 102.

VS-CSCF groups 106 comprise groups of servers that provide virtualized call/session control functions for communications through IMS platform 102. In general a serving CSCF registers a user's device and provides service to the user (even though these services may be on separate application platforms). A serving CSCF performs routing and translation, provides billing information to billing systems, maintains session timers, and interrogates the HSS to retrieve authorization, service triggering information and user profile. Further details on the operation of VS-CSCF groups 106 are provided below with reference to FIGS. 2A-2D and 3.

VP-CSCF groups 108 comprise groups of servers that provide virtualized proxy call/session control functions for communications through IMS platform 102. In general, a proxy CSCF is the first point of contact within the IMS platform 102 for a users communication device such as VoIP device 126, wireless device 124, soft phone 122, or POTS phone 120. The P-CSCF may be located in a home or a visited network. The P-CSCF ensures that registration information is passed to the correct home network and that session messages are passed to the correct Serving CSCF (S-CSCF) once registration has occurred. Contact with the home network during registration is through the home network I-CSCF 112. Further details on the operation of VP-CSCF groups 108 are provided below with reference to FIGS. 2A-2D.

Interrogating CSCF (I-CSCF) 112 handles incoming registration and determines the VS-CSCF of a VS-CSCF group 106 with which a user should register. In general, this is achieved by querying HSS 104, or optionally a Subscriber Location Function (SLF) to locate the HSS serving the subscriber, which checks that the user is allowed to register in the originating network and indicates a VS-CSCF that is to be used. The I-CSCF 112 can be removed from the signalling path once it has been used to establish which VS-CSCF is to be used.

Figure 2A:
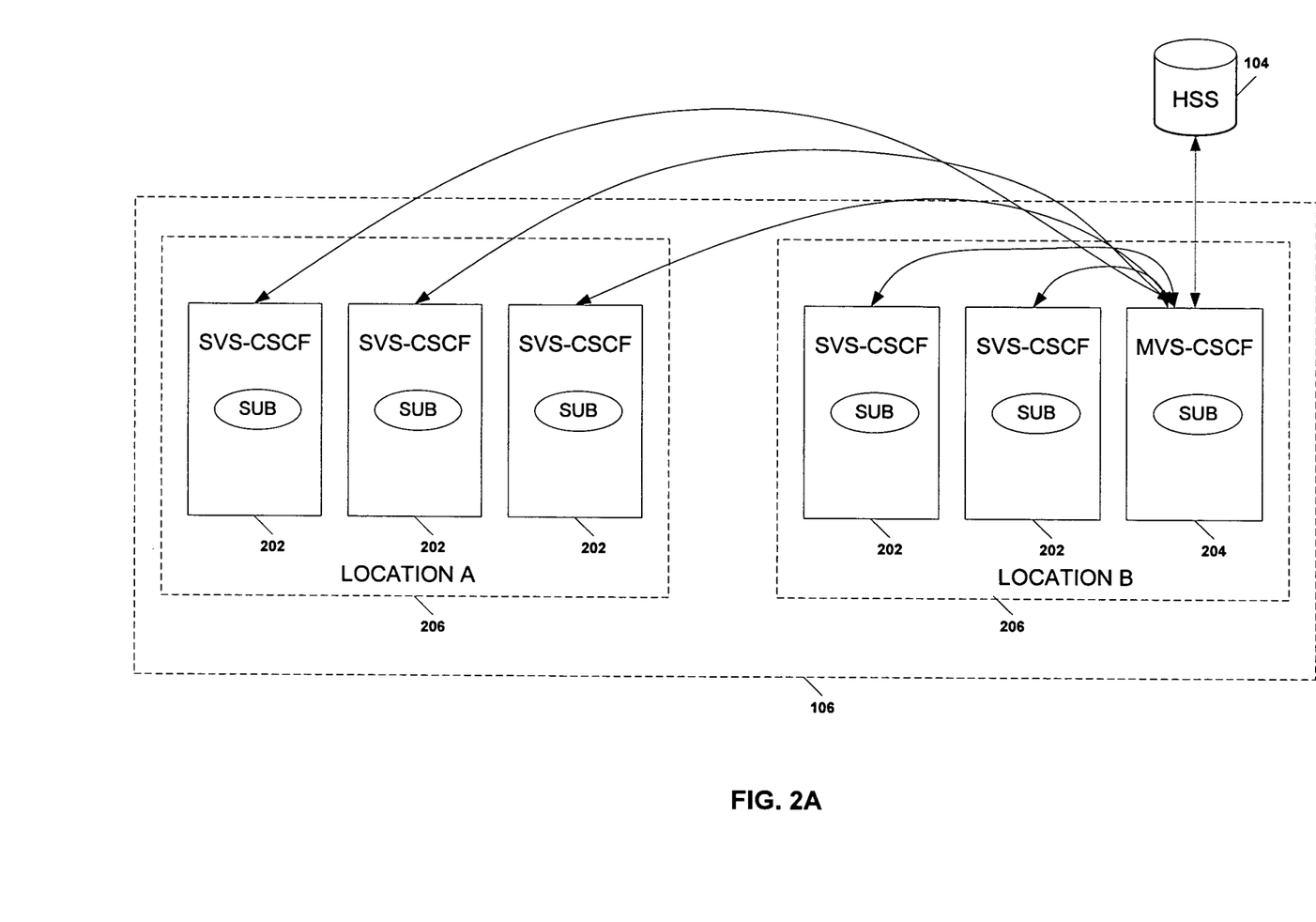
FIG. 2A illustrates a diagrammatic representation of a virtual serving call/session control function group in accordance with an example embodiment.

FIG. 2A illustrates a diagrammatic representation providing further details on the operation of VS-CSCF groups 106 in accordance with an example embodiment. A VS-CSCF group 106 may include one or more slave VS-CSCF (SVS-CSCF) servers 202 and one master VS-CSCF (MVS-CSCF) server 204 for a subscriber. Another registered subscriber may be served by the same or a different MVS-CSCF, depending upon whether the MVS-CSCF is dynamically or statically assigned. The SVS-CSCF servers 202 and MVS-CSCF servers 204 may be distributed across one or more locations 206. Any one of SVS-CSCF servers 202 or MVS-CSCF server 204 may be selected to serve a subscriber and will function in the same way for the selected subscriber. Further, an S-CSCF function that is part of the same VS-CSCF group 106 can be instantiated on any physical server in a group of servers that support the VS-CSCF group 106.

In some embodiments, all subscribers registered to the VS-CSCF function in the same VS-CSCF Group 106 have the same subscriber data and initial filter criteria (iFC).

In some embodiments, subscriber data, updates, registrations and deregistrations that are to be downloaded to a VS-CSCF are downloaded to a single instantiation of an S-CSCF in the VS-CSCF group 106, referred to as the Master VS-CSCF (MVS-CSCF) 204. The MVS-CSCF 204 then distributes the subscriber data and iFC to all the other S-CSCFs in the VS-CSCF group, which are referred to as Slave VS-CSCF (SVS-CSCF) 202. In these embodiments, the MVS-CSCF 204 knows the addresses of the SVS-CSCF in the group 106 in order to distribute the subscriber data.

In alternative embodiments, a fully qualified domain name (FQDN) may be defined for the SVS-CSCF 202 to allow the MVS-CSCF 204 to query a domain name server (DNS, not shown) to receive the addresses of the SVS-CSCF 202.

In a further alternative embodiment, subscriber data and iFC may be distributed by HSS 104 broadcasting the subscriber data and iFC to all S-CSCFs in the VS-CSCF group 106. In these embodiments, HSS 104 maintains topology specific configuration information.

Still further embodiments allow a more granular specification of the VS-CSCF group 106. In these embodiments, a subscriber's user profile in the HSS 104 contains the VS-CSCF group 106 information. Thus, an I-CSCF can use the profile to choose an VS-CSCF 202 during registration. This allows the groups 106 to be specified per subscriber. Upon registration, the HSS 104 broadcasts the subscriber data and iFC to the VS-CSCFs 202 in the VS-CSCF group 106 defined in the specific user's profile.

Figure 2B:
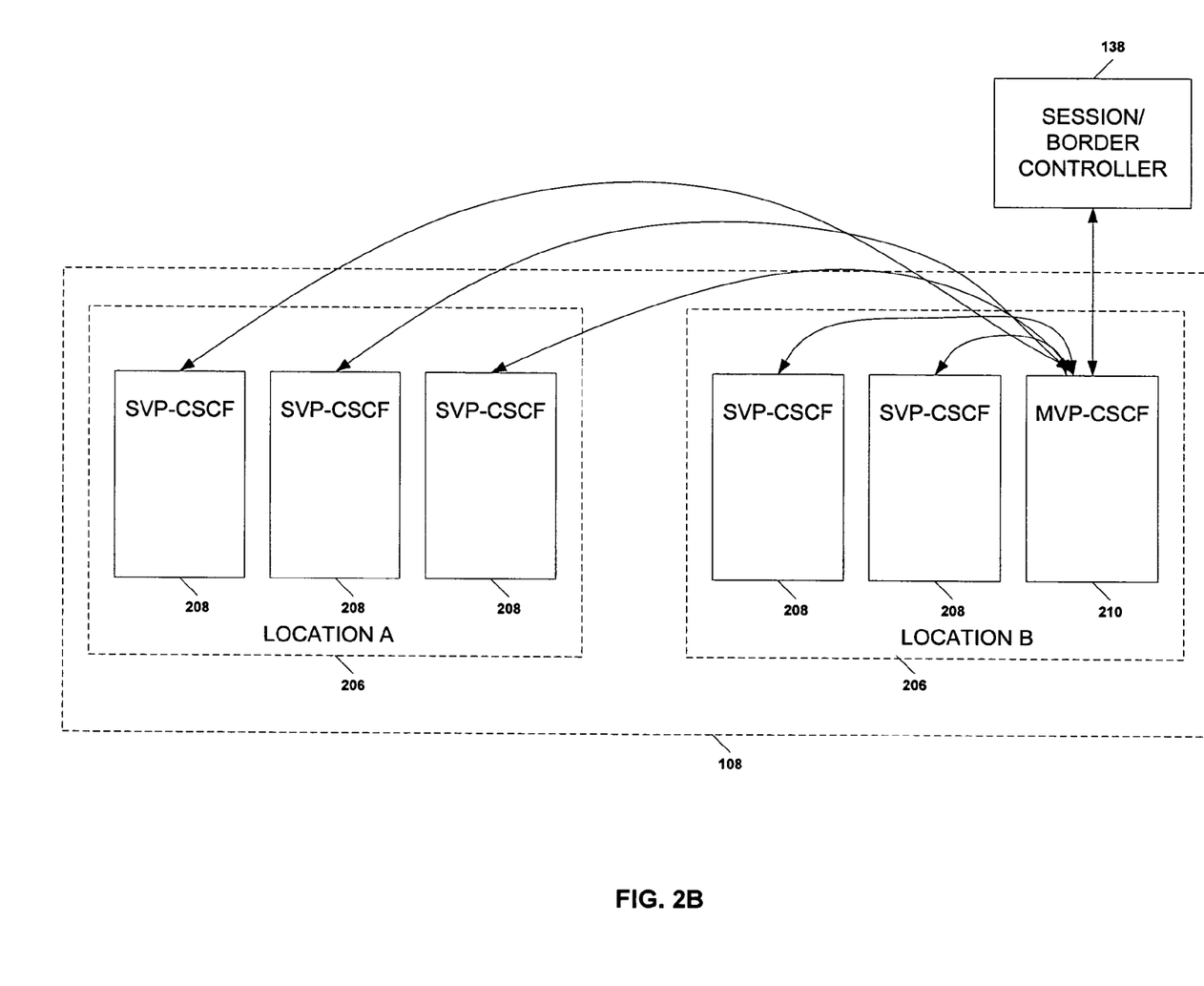
FIG. 2B illustrates a diagrammatic representation of a virtual proxy call/session control function group in accordance with an example embodiment.

FIG. 2B illustrates a diagrammatic representation providing further details on the operation of VP-CSCF groups 108 in accordance with an example embodiment. In some embodiments, a Virtual Proxy-CSCF (VP-CSCF) is defined that allows registered users to be registered through any server that has an instantiation of the P-CSCF on a physical server, in the VP-CSCF group 108. The instantiation may be a slave VP-CSCF (SVP-CSCF) 208 or a master VP-CSCF (MVP-CSCF) 210. In some embodiments, following receipt of an initial registration request for a subscriber, the P-CSCF receiving the initial registration requests becomes the MVP-CSCF 210. The designated MVP-CSCF 210 then distributes the registration information to the other SVP-CSCFs 208 following a successful registration. Any changes of registration may be communicated to the SVP-CSCF 208 by the MVP-CSCF 210.

In alternative embodiments, an MVP-CSCF 210 uses a FQDN of the SVP-CSCF 208 to address registration information to the SVP-CSCFs 208 in the group 108. Thus, the MVP-CSCF 210 can use the addresses returned from a DNS (not shown) to translate the FQDN to the SVP-CSCF 208 addresses in order to distribute the registration information.

Figure 2C:
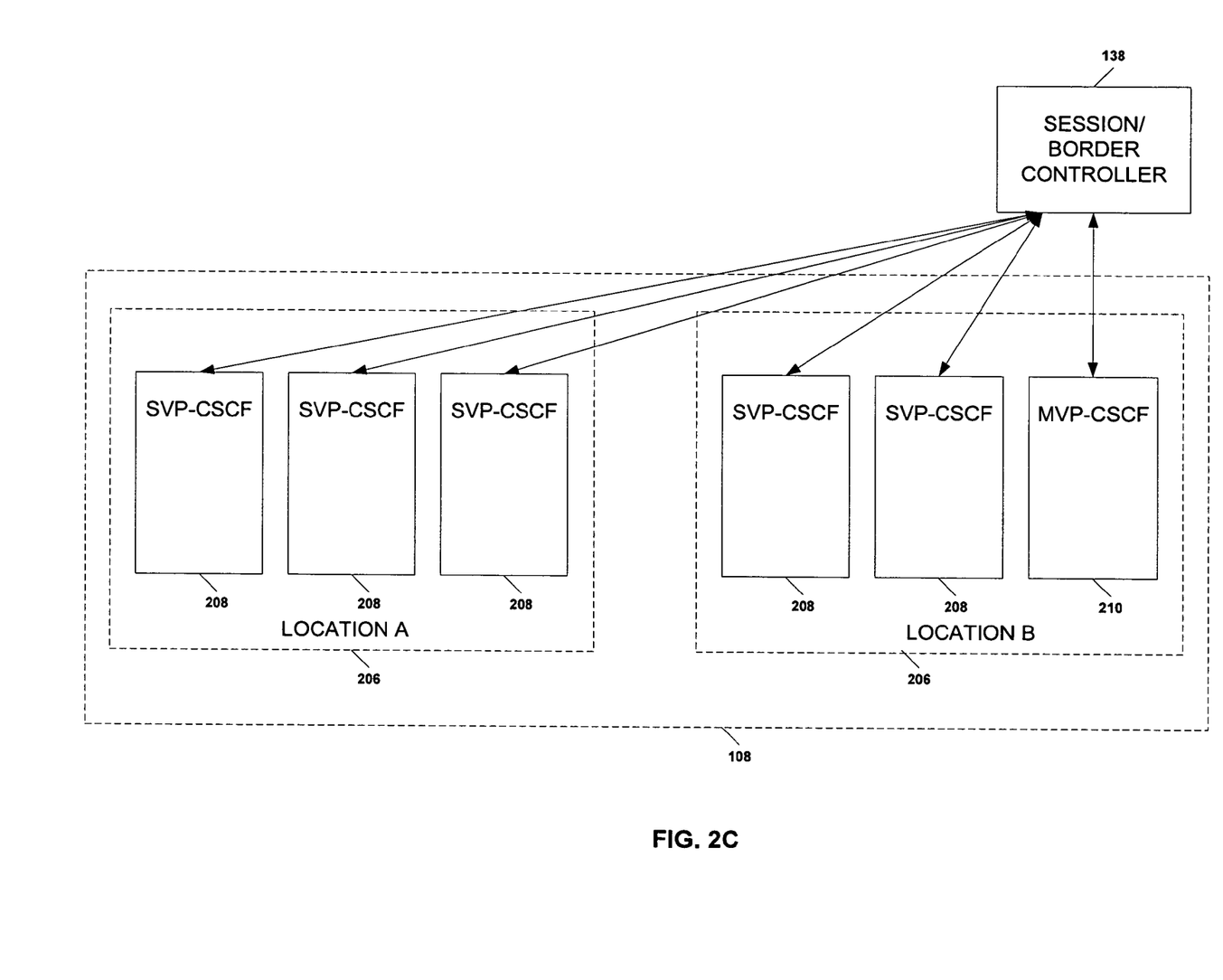
FIG. 2C illustrates a diagrammatic representation of a virtual proxy call/session control function group in accordance with an alternative example embodiment.

FIG. 2C illustrates a diagrammatic representation providing still further details on the operation of VP-CSCF groups 108 in accordance with example embodiments. The example illustrated in FIG. 2C shows the interaction of VP-CSCF groups 108 with an S/BC 138. In some embodiments, for outbound calling from a subscriber, a Session/Border Controller 138 distributes traffic to any VP-CSCF 208 within a group 108 that physically resides on an individual server. The S/BC 138 can distribute traffic in a number of methods, e.g., round-robin, priority or percent based routing, to the VP-CSCFs 208 in the VP-CSCF group 108. Round-robin scheduling may be desirable for even traffic distribution, assuming all the physical servers hosting the VP-CSCFs 208 in the VP-CSCF group 108 have the same performance and capacity. The S/BC 138 can use a DNS (not shown), either a separate physical DNS server, an on-board DNS server on the physical S/BC server 138 or another routing table, to translate the P-CSCF address to an address of the physical server with a P-CSCF in the VP-CSCF group 108, an MVP-CSCF 210 or SVP-CSCF 208.

Figure 2D:
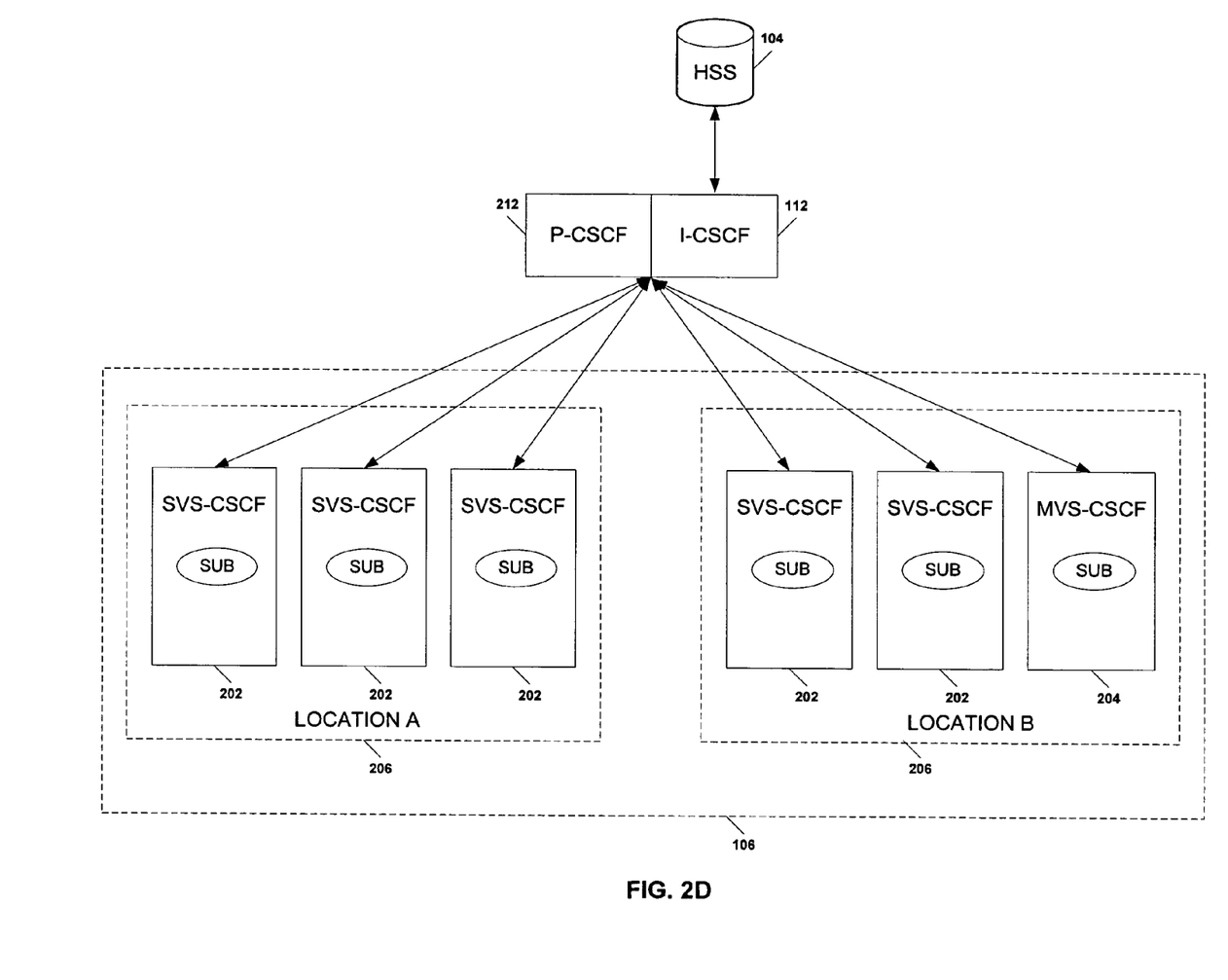
FIG. 2D illustrates a diagrammatic representation of a virtual serving call/session control function group in accordance with an alternative example embodiment.

FIG. 2D illustrates a diagrammatic representation providing further details on the operation of VS-CSCF groups 106 in accordance with an alternative example embodiment. The example illustrated in FIG. 2D shows the interaction of an I-CSCF 112 or P-CSCF 212 and VS-CSCF for inbound calling. In this example, the Interrogating-CSCF 112 obtains the address of the VS-CSCF group 106 from the HSS 104. Any of a number of methods may be used to determine the physical address of the specific MVS-CSCF 204 or SVS-CSCF 202. In some embodiments, the HSS 104 may provide the actual address, where the HSS 104 knows the topology, the MVS-CSCF or the SVS-CSCF. In alternative embodiments, the I-CSCF 112 can use a DNS (not shown), either a separate physical DNS server, an on-board DNS server on the physical server hosting the I-CSCF or another routing table, to translate the VS-CSCF address to an address of the physical server with an S-CSCF in the VS-CSCF group 106, an MVS-CSCF 204 or SVS-CSCF 202.

Additionally, the VS-CSCF can distribute to any VP-CSCF in the VP-CSCF group for calls to a subscriber. For calls originated by a subscriber, the P-CSCF 212 can also distribute traffic to the VS-CSCF group using the virtual address of the group.

In the inbound and outbound calling examples discussed above, distribution of traffic can be accomplished by a number of methods, e.g., round-robin, priority or percent based routing. Round-robin scheduling may be used for even traffic distribution, assuming all the physical servers hosting the functions in the group that have the same performance and capacity.

Further, with respect to traffic between a PSTN network and an IMS platform 102 that is handled by an MGCF, the MGCF can distribute inbound traffic using round-robin (desirable when the I-CSCF functions are on servers of equal capacity), priority basis, or percent basis to the I-CSCF using either on-board routing tables or using DNS to translate a FQDN for the I-CSCF to the IP address of the I-CSCF.

Figure 3:
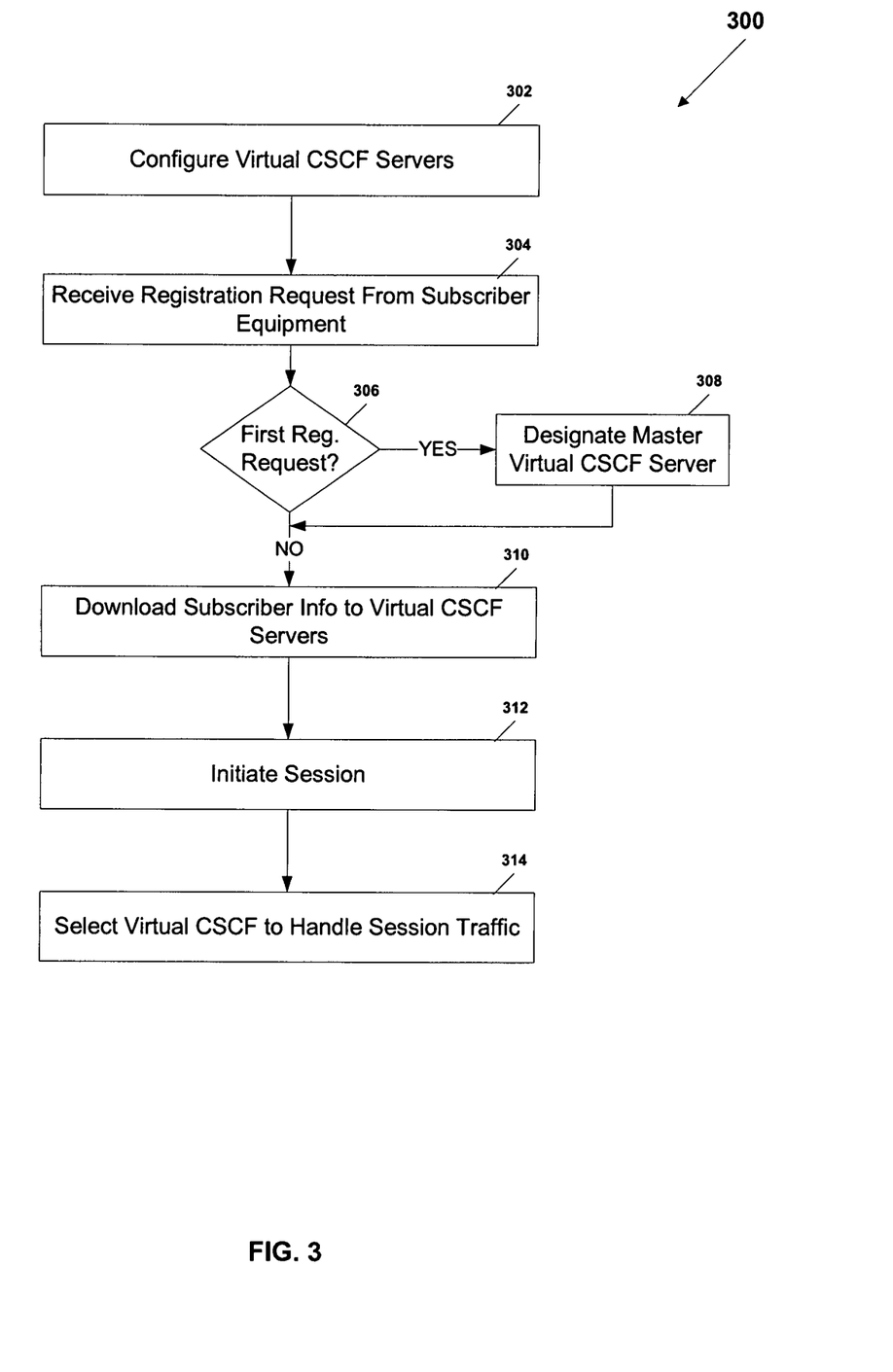
FIG. 3 is a flowchart illustrating methods for providing virtual call/session control functions in accordance with example embodiments.

FIG. 3 is a flowchart 300 illustrating methods for providing virtual call/session control functions in accordance with example embodiments. In some embodiments, the method begins at block 302, where one or more groups of one or more virtual servers are configured. Configuration may include determining network addresses for the server groups. The server groups may be configured as VS-CSCF server groups or VP-CSCF server groups.

At block 304, an IMS system receives a registration request from subscriber equipment. As an example, a registration request may be generated as a subscriber turns the power on for a mobile phone, a SIP or other VoIP capable phone, a soft phone, or any other phone that may need to communicate with an IMS system.

In some embodiments, registration of subscribers uses the IMS standard registration procedures. However, the embodiments are not limited to any particular registration procedure, and alternative embodiments may use static provisioned registration, using an Operations, Administration, Maintenance and Provisioning (OAMP) interface (terminal or Operations Support System (OSS)) for provisioning the static registrations in the HSS, the VP-CSCF and the VS-CSCF. Static provisioning may be used in the case of subscribers on an IP PBX or a wholesale customer of a carrier, etc, that are fixed in a location and access point, and not nomadic.

In some embodiments, at block 306, the IMS system determines if the registration request is the first request received. If so, at block 308 the system assigns one of the virtual CSCFs to be a master virtual CSCF for the group. For example, an I-CSCF receiving a first registration request may select a first instance of a VS-CSCF as an MVS-CSCF. Alternatively, the I-CSCF may randomly select one of the VS-CSCFs to be the MVS-CSCF for the group. Similarly, an S/BC that receives a registration request may select a first instance of a VP-CSCF to be the MVP-CSCF for the group. Alternatively, the SBC may randomly select a proxy CSCF to be the MVP-CSCF.

In alternative embodiments where assignments of an MVS-CSCF or an MVP-CSCF is not derived dynamically as described above for blocks 306 and 308, the assignments of MVS-CSCF and/or MVP-CSCF may be provisioned as part of the configuration done above at block 302.

At block 310, subscriber or registration data is downloaded to the virtual CSCFs, e.g., the VS-CSCFs and/or the VP-CSCFs, respectively. In some embodiments, the MVS-CSCF receives subscriber data from an HSS, and forwards the downloaded subscriber data to the VS-CSCFs in the VS-CSCF group. Similarly, the MVP-CSCF distributes registration data to the VP-CSCFs in a VP-CSCF group. The downloaded subscriber data may include initial filter criteria used to determine the applications and/or application servers required by a subscriber.

In these embodiments, the MVS-CSCF or MVP-CSCF knows the addresses of the slave virtual CSCFs in the group to distribute the subscriber data or registration data, respectively. Alternatively, a FQDN may be defined for the VS-CSCF or VP-CSCF to allow the MVS-CSCF or MVP-CSCF to query a DNS to receive all the addresses of the slave virtual CSCFs.

In alternative embodiments, the subscriber data and the iFC are distributed to the VS-CSCF group by the HSS, which broadcasts the subscriber data and iFC to all VS-CSCFs in the VS-CSCF group. In these embodiments, the HSS has topology configuration information.

In further alternative embodiments, a subscriber's user profile in the HSS contains the VS-CSCF group information. In these embodiments, the I-CSCF may use the subscriber profile data to choose an VS-CSCF during registration. This allows the groups to be specified per subscriber. Upon registration, the HSS then broadcasts the subscriber data and iFC to the VS-CSCFs in the VS-CSCF group defined in that specific user's profile.

In any of the above embodiments, the VS-CSCF or VP-CSCF function for the same registered subscriber may served by multiple servers in the server group.

At block 312 the IMS system initiates a session in response to an inbound or outbound call. For outbound calling from a subscriber, at block 314 a Session/Border Controller (S/BC) that distributes traffic to a VP-CSCF group can distribute traffic to any P-CSCF within the group that physically resides on an individual server. The S/BC can distribute traffic in a number of methods, e.g., round-robin, priority or percent based routing, to the P-CSCFs in the VP-CSCF group. Round-robin may be a desirable method for even traffic distribution, assuming all the physical servers hosting the P-CSCFs in the VP-CSCF group have the same performance and capacity. The S/BC can use a Domain Name Server (DNS), either a separate physical DNS server, an on-board DNS server on the physical S/BC server or another routing table, to translate the VP-CSCF address to an address of the physical server with a P-CSCF in the VP-CSCF group, an MVP-CSCF or SVP-CSCF.

For inbound calling to the subscriber, at block 314 the Interrogating-CSCF (I-CSCF) obtains the address of the VS-CSCF group from the HSS. A number of methods may be used to determine the physical address of the specific MVS-CSCF or SVS-CSCF. The HSS may provide the actual address, when the HSS knows the topology of the MVS-CSCF or SVS-CSCFs. Alternatively, the I-CSCF can use a Domain Name Server (DNS), either a separate physical DNS server, an on-board DNS server on the physical server hosting the I-CSCF or another routing table, to translate the VS-CSCF address to an address of the physical server with an S-CSCF in the VS-CSCF group, an MVS-CSCF or SVS-CSCF.

Additionally, the VS-CSCF can distribute to any VP-CSCF in the VP-CSCF group, or vice versa for outbound calling.

In both of these cases, distribution of traffic can be accomplished by a number of methods, e.g., round-robin, priority or percent based routing. Round-robin may be desirable for even traffic distribution, assuming all the physical servers hosting the functions in the group that have the same performance and capacity.

It should be noted that if there is a failure of an MVS-CSCF or MVP-CSCF, or if an MVS-CSCF or MVP-CSCF goes out-of-service, one of the other virtual CSCFs will still be able to process the call. Registration may then result in a new MVS-CSCF or MVP-CSCF to be assigned as described above.

Figure 4:
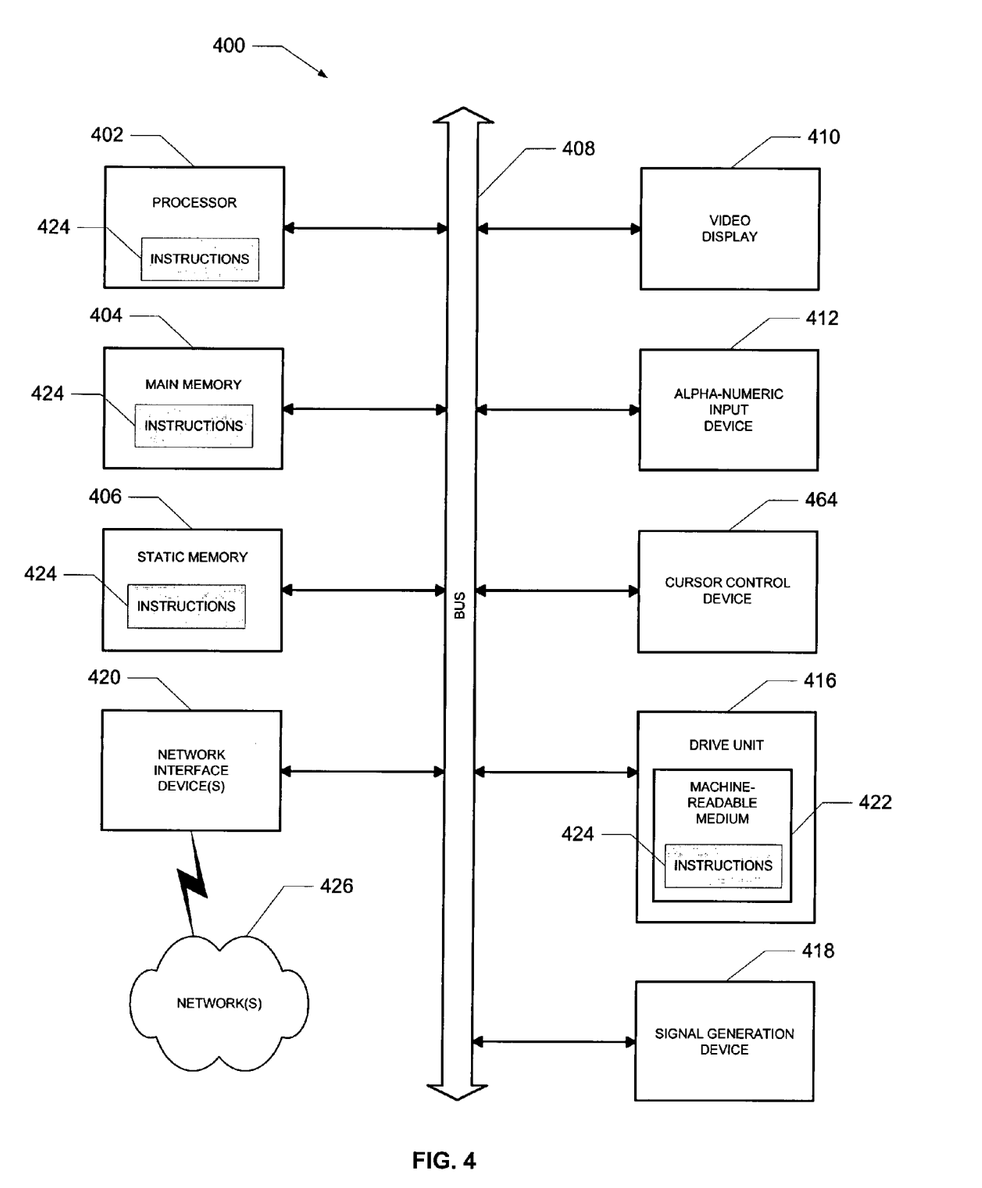
FIG. 4 illustrates a diagrammatic representation of machine in the example form of a computer system within which a set of instructions, for causing the machine to perform any one or more of the methodologies discussed herein, may be executed.

FIG. 4 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 412 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416 (e.g., a storage), a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 412 during execution thereof by the computer system 400, the main memory 404 and the processor 412 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although various embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, by a processor, a first registration request; and
    determining, by the processor, a master virtual call session control function server from a virtual call session control function group comprising a plurality of virtual call session control function servers, wherein each of the virtual call session control function servers is implemented in a physical server, wherein the master virtual call session control function server is determined based upon a user profile, wherein the determining the master virtual call session control function server includes selecting one of the plurality of virtual call session control function servers to be the master virtual call session control function server in response to receiving the first registration request, wherein the master virtual call session control function server is for downloading subscriber data to the plurality of virtual call session control function servers, wherein the subscriber data is received by the master virtual call session control function server from a home subscriber server.

2. The method of claim 1, wherein the plurality of virtual call session control function servers comprises virtual serving call session control function servers.

3. The method of claim 1, wherein the plurality of virtual call session control function servers comprises virtual proxy call session control function servers.

4. The method of claim 1, further comprising:
initiating a call session; and
selecting one of the virtual call session control function servers in the plurality of virtual call session control function servers to handle the call session.

5. The method of claim 4, wherein the selecting the one of the virtual call session control function servers includes utilizing a round-robin scheduler to select the one of the virtual call session control function servers.

6. The method of claim 5, wherein the selecting the one of the virtual call session control function servers includes utilizing a priority to select the one of the virtual call session control function servers.

7. The method of claim 5, wherein the selecting the one of the virtual call session control function servers includes utilizing a utilization percentage to select the one of the virtual call session control function servers.

8. An internet protocol multimedia system comprising:
a home subscriber server to maintain subscriber data; and
a virtual serving call session control function group, the virtual serving call session control function group including a plurality of virtual serving call session control function servers, each of the virtual serving call session control function servers being implemented in a physical server, the plurality of virtual serving call session control function servers including a master virtual serving call session control function server, wherein the master virtual serving call session control function server is determined by a selection of one of the plurality of virtual serving call session control function servers in response to receiving a first registration request;
wherein the master virtual serving call session control function server is for receiving the subscriber data from the home subscriber server and to download the subscriber data to the plurality of virtual serving call session control function servers, wherein the master virtual call session control function server is determined based upon a user profile.

9. The internet protocol multimedia system of claim 8, further comprising a virtual proxy call session control function group, the virtual proxy call session control function group including a plurality of virtual proxy call session control function servers, the plurality of virtual proxy call session control function servers including a master virtual proxy call session control function server;
wherein registration data is distributed to the plurality of virtual proxy call session control function servers.

10. A non-transitory computer-readable medium storing a plurality of instructions which, when executed by a processor, cause the processor to perform operations, the operations comprising:
receiving a first registration request; and
determining a master virtual call session control function server from a virtual call session control function group comprising a plurality of virtual call session control function servers, wherein each of the virtual call session control function servers is implemented in a physical server, wherein the master virtual call session control function server is determined based upon a user profile, wherein the determining the master virtual call session control function server includes selecting one of the plurality of virtual call session control function servers to be the master virtual call session control function server in response to receiving the first registration request,
wherein the master virtual call session control function server is for downloading subscriber data to the plurality of virtual call session control function servers, wherein the subscriber data is received by the master virtual call session control function server from a home subscriber server.

11. The non-transitory computer-readable medium of claim 10, wherein the operations further comprise:
initiating a call session; and
selecting one of the virtual call session control function servers in the plurality of virtual call session control function servers to handle the call session.

12. An apparatus comprising:
a master virtual call session control function server implemented in a physical server, wherein the master virtual call session control function server is a member of a group comprising a plurality of virtual call session control function servers, wherein the master virtual call session control function server is determined based upon a user profile and by a selection of one of the plurality of virtual serving call session control function servers in response to receiving a first registration request, the master virtual call session control function server operable to:
receive subscriber data from a home subscriber server; and
download the subscriber data to the plurality of virtual call session control function servers.

13. The apparatus of claim 12, wherein each of the plurality of virtual call session control function servers comprises a virtual serving call session control function server.

* * * * *